Patented Oct. 13, 1942

2,298,931

UNITED STATES PATENT OFFICE 2,298,931

PROCESS FOR THE TREATMENT OF HYDROCARBONS

Harry E. Drennan, Bartlesville, Okla., assignor to Phillips Petroleum Company, a corporation of Delaware No Drawing. Application October 5, 1940, Serial No. 359,967

11 Claims. (Cl. 260—683)

This invention relates to a process for the catalytic isomerization of olefinic hydrocarbons, and more specifically to a novel catalyst and process for the conversion of alpha olefins to beta olefins in hydrocarbon mixtures in the vapor phase at elevated temperatures.

Alpha olefins generally referred to as 1-olefins undergo an isomerization reaction whereby the unsaturated linkage migrates toward the center of the carbon chain and beta or 2-olefins are formed. In the case of normal butenes, this reaction may be represented by the equation

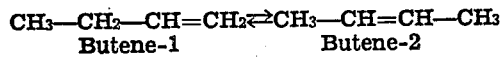

Butene-1           Butene-2

The isomers thus represented are identical in many of their chemical properties but differ rather widely in some physical characteristics. The 1-olefins for example are lower-boiling than either the 2-olefins or the corresponding paraffin hydrocarbons. This quality of butene-1 causes it to complicate the separation steps of processes producing or utilizing $C_4$ olefins, diolefins or isoolefins since the boiling point of butene-1 is practically the same as that of isobutene and butadiene. Thus butene-1 may appear as a contaminant in isobutene or butadiene fractions prepared by distillation, and processes involving the recovery of butenes from $C_4$ mixtures are subject to difficulties and losses since an appreciable portion of said butenes may be present as an isomer lower-boiling than the normal paraffin.

On the basis of these and other considerations, it is often desirable to have the normal olefins as completely as possible in either the alpha or the beta form, and for many processes the latter form is preferable. Inability to bring about this conversion or isomerization has led in some cases to the employment of complex chemical separation and/or solvent extraction methods for the segregation of components of a hydrocarbon mixture.

The reaction which converts alpha olefins to beta olefins has been found to be of the time-equilibrium type. In other words butene-1 is converted gradually into butene-2 or vice versa until the concentration of the respective components reaches the equilibrium concentrations noted in the following table of equilibria at various temperatures.

| Temperature, ° F. | Concentration in mol per cent | |
|---|---|---|
| | Butene-1 | Butene-2 |
| 80 | 2.9 | 97.1 |
| 260 | 7.7 | 92.3 |
| 440 | 13.7 | 86.3 |
| 620 | 19.8 | 80.2 |
| 980 | 30.3 | 69.7 |
| 1,340 | 38.5 | 61.5 |

From this tabulation it is seen that at high temperatures maximum amounts of butene-1 are formed, while the maximum concentrations of butene-2 are formed at low temperatures. Also, while only about 40 per cent conversion to butene-1 is possible, 97 per cent conversion to butene-2 is possible if equilibrium can be reached at very low temperatures. Since the extent of conversion of one isomer to the other depends on the isomerization reaction velocity and on the time allowed for the reaction, it is evident that in any commercial operation equilibrium concentrations are attainable only when suitable treating conditions can be met.

Isomerization by thermal methods is unsatisfactory because the slow rate of reaction at low temperature levels prevents appreciable conversion of butene-1 to butene-2. Attempts also have been made to control the rate of isomerization reaction by means of catalysts and to thus obtain extensive conversion of butene-1 to butene-2 at relatively low temperatures. The difficulty with previous catalytic processes has been that the less active catalyst required too high temperatures with the result that butene-2 concentrations were limited, while the more active catalysts concurrently promoted polymerization reactions which resulted in excessive losses of olefins and other reactive components of hydrocarbon mixtures undergoing isomerization.

I have now discovered a novel catalyst for the isomerization of butene-1 which is active at such conditions of temperature and flow rate that equilibrium concentrations of butene-2 are obtained with negligible losses of olefins and diolefins through polymer formation.

I have found that when copper oxide is treated with a non-volatile strong mineral acid such as sulfuric or phosphoric acid or solutions thereof an active catalyst is produced for the isomerization of 1-olefins at low temperatures.

In the preparation of the catalyst granular, wire-form or sponge copper oxide of suitable particle size is treated with concentrated or dilute acid in such proportions that 5 to 25 percent by weight of acid is added to the copper oxide. The copper oxide may be substantially pure material or it may be supported on a base of metallic copper as in case of copper wire or sponge which is only partially converted to the oxide. The primary reaction occurring following the addition of acid to copper oxide is the formation of the corresponding copper salts. Since the amount of acid so added is insufficient for complete conversion of the copper oxide the resulting catalyst comprises a mixture of copper oxide, sulfate or phosphate, and some free acid during the period necessary for complete penetration and reaction of the acid through the salt film. The physical structure of the copper oxide particles is not destroyed, so that a granular catalyst of excellent surface characteristics is obtained.

The amount of acid added during the treatment and/or impregnation of the copper oxide may vary rather widely. Usually more than 5 per cent by weight of either acid is used, and the activity of the catalyst increases with increasing acid content up to about 20 weight per cent of the copper oxide. Since the activity of the catalyst governs the temperature of operation and/or the flow rate of reactants over the catalyst, I prefer to use copper oxide treated with 10–20 per cent by weight of acid.

Acid may be added to the copper oxide in any convenient manner such as spraying as a mist onto the oxide particles, or the particles may be soaked in acid or acid solution until the calculated quantities have been taken up. Excess water of solution may be removed from the catalyst prior to use by heating to moderate drying temperatures. The finished reagent appears dry and neither acid nor aqueous material is carried away by the hydrocarbon vapors.

In the operation of the process of my invention a hydrocarbon mixture containing butene-1 is heated to a temperature in the range of 150 to about 600° F. and passed in vapor phase over a catalyst prepared in the manner described. The flow rate is maintained at a value which gives maximum conversion to butene-2 without appreciable formation of heavy polymers, usually between 0.5 and 5 liquid volumes of feed per hour per volume of catalyst.

The flow rate and temperature of any specific operation may be adjusted to the activity of the catalyst according to the factors previously described as affecting the conversion. Thus, as the activity of the catalyst is increased, the rate of isomerization is increased, or equivalent conversion may be obtained at a lower temperature or a higher flow rate of reactant. Low temperatures are desirable in view of the high equilibrium concentrations of butene-2 attainable, while higher flow rates have a tendency to suppress polymerization reactions. In general, the proper choice of operating conditions within the optimum temperature range of 150 to 600° F. will be apparent in view of the foregoing disclosure.

Catalysts prepared in the manner described have superior activity when compared with any of the possible individual components either alone or in mixtures prepared by other means. The differences in activity are attributed to the peculiar combination produced by treatment of copper oxide or copper oxide-containing materials with sulfuric or phosphoric acid since this combination is superior to catalysts prepared from copper sulfate or copper phosphate. Thus, the isomerization of butene-1 over copper sulfate requires a temperature above 750° F., while the same conversion with my preferred catalyst is effected at temperatures of 200–300° F. This comparison indicates a marked difference in the catalyst and not a mere difference in degree of activity.

Pressures in my process are low super-atmospheric pressures of zero to 100 pounds gage. Higher pressures tend to promote polymerization, although they may be used in certain instances such as the presence of a diluent.

The catalytic treatment of my invention is applicable to substantially pure 1-olefins or to hydrocarbon mixtures containing same in varying concentrations and from any source such as the dehydration of alcohols or the like, or the dehydrogenation and/or pyrolysis of suitable hydrocarbon materials.

The effluents from my process containing equilibrium concentrations of 2-olefins may be treated subsequently in any desired fashion to separate and utilize said olefins such as segregation by distillation or by chemical methods followed by further dehydrogenation, polymerization or the like. If desired, the hydrocarbon mixture following removal or utilization of 2-olefins may be returned for further isomerization treatment until the 1-olefin content is substantially completely utilized. Or additional 1-olefins may be produced in said mixture by suitable means prior to successive isomerization treatments.

The following examples will serve to illustrate methods of preparing catalysts and using same according to the terms of my invention. However, since the number of modifications might be greatly multiplied, said examples are not to be construed as limitations.

Example I

Butene-1 was passed through a reaction chamber filled with porous granular copper oxide treated with 10 per cent of its weight of sulphuric acid and which was heated to a temperature of 260° F. The effluent gas contains about 92 per cent butene-2 and 8 per cent of butene-1. Only a trace of polymer was formed at a flow rate of 0.5 liquid volume of charge per hour per volume of catalyst.

When butene-1 was passed over a catalyst composed of copper sulfate on pumice, a temperature of 750° F. was required for rapid conversion yielding 75 per cent of butene-2.

Example II

When pentene-1 is passed over a catalyst prepared by treating wire-form copper oxide with 15 per cent by weight of sulfuric acid, with the temperature of treatment at 400° F. and a flow rate of one liquid volume of pentene per hour per volume of catalyst, the $C_5$ fraction of the effluents contains 75 per cent of pentene-2, and 10 per cent of the charge is converted to heavy polymers.

Example III

Butene-1 was passed through a tube filled with porous granular copper oxide treated with 25 per cent of its weight of phosphoric acid, and which was heated to 450° F. The effluent gas contained about 85 per cent butene-2 and 15 per cent butene-1. About 3 per cent of the initial materials were converted into liquid polymerization products.

When my acid-copper oxide catalysts lose activity after long periods of use, I have noted that a measure of activity may be restored by treatment with additional acid. In this manner, the catalysts may be periodically treated to maintain high activity up to the point where the oxide content is substantially consumed.

I claim:

1. A process for the catalytic isomerization of 1-olefins to produce 2-olefins which comprises treating said 1-olefins under isomerizing conditions over a solid catalyst comprising copper oxide and a copper salt and prepared by treating copper oxide with a non-volatile strong mineral acid.

2. A process for the catalytic isomerization of 1-olefins to produce 2-olefins which comprises treating hydrocarbon mixtures containing said 1-olefins under isomerizing conditions over a solid catalyst consisting of copper oxide reacted with 5–25 per cent by weight of a non-volatile strong mineral acid.

3. A process for the catalytic isomerization of butene-1 which comprises treating hydrocarbon gases containing said butene-1 under isomerizing conditions over a catalyst prepared by treating copper oxide with at least 5 per cent by weight of sulfuric acid.

4. A process for the catalytic isomerization of butene-1 which comprises treating hydrocarbon gases containing said butene-1 under isomerizing conditions over a solid catalyst containing copper oxide and a copper salt and prepared by treating copper oxide with at least 5 per cent by weight of phosphoric acid.

5. A process for the catalytic isomerization of butene-1 which comprises treating hydrocarbon mixtures containing said butene-1 in vapor phase at temperatures above about 150° F. and at near-atmospheric pressures over a solid catalyst consisting of copper oxide reacted with 5–25 per cent by weight of a non-volatile strong mineral acid.

6. A solid catalyst for the isomerization of 1-olefins to produce 2-olefins by treatment in vapor phase at super-atmospheric temperatures which consists of copper oxide partially reacted with a non-volatile strong mineral acid.

7. A solid catalyst for the isomerization of 1-olefins to produce 2-olefins by treatment in vapor phase at super-atmospheric temperatures which consists of copper oxide reacted with 5 to 25 per cent by weight of a non-volatile strong mineral acid.

8. A process for the catalytic isomerization of 1-olefins to produce 2-olefins which comprises contacting said 1-olefins under isomerizing conditions with a solid catalyst comprising copper oxide supporting a copper salt of a non-volatile strong mineral acid.

9. A process for the catalytic isomerization of butene-1 to butene-2 which comprises contacting said butene-1 under isomerizing conditions with a solid catalyst comprising copper oxide supporting a copper salt and prepared by partially reacting granular copper oxide with a non-volatile strong mineral acid.

10. A solid catalyst for the isomerization of 1-olefins to 2-olefins which comprises copper oxide supporting a copper salt of a non-volatile strong mineral acid.

11. A solid catalyst for the isomerization of 1-olefins to produce 2-olefins which consists of copper oxide bearing a copper salt thereon and having been obtained by partially reacting copper oxide with a non-volatile strong mineral acid.

HARRY E. DRENNAN.